United States Patent Office 3,508,453
Patented Apr. 28, 1970

3,508,453
PRE-STRESSING OF LOAD-BEARING MEMBERS
Richard Samuel Jonathan Good, Manchester, and Arthur Henry Hitchcock, Kirby Muxloe, England, assignors to Marwin Machine Tools Limited, Anstey, England
Filed May 10, 1968, Ser. No. 728,193
Claims priority, application Great Britain, May 13, 1967, 22,297/67
Int. Cl. F16h 1/18, 55/18
U.S. Cl. 74—441          5 Claims

ABSTRACT OF THE DISCLOSURE

The present method and apparatus stresses or tensions a load-bearing member by the application of pressure from a column of fluid of a stiffness of at least the same order of magnitude as that of the member while maintaining said pressure constant.

---

The invention relates to the stressing of load-bearing members, such as strut or tie bars or lead screws, for damping vibration or flutter and increasing the precision of operation.

According to the invention a load-bearing member is stressed by means of a column of fluid of stiffness of the same order of magnitude as or greater than that of the member and maintained at a constant pressure. By stiffness of a column of fluid- or load-bearing member it is meant that the proportionate amount that the column or member yields due to the compression of the fluid or material, but not due to bending, under a load applied along the axis of the column or member. The member is generally tensioned by means of stress applied at a part of the member remote from that at which the member is secured. The constant pressure is determined according to the characteristics of the machine or structure to which the invention is applied, the dead weight to be held, or the intended function, and may be varied according to the circumstances. A pressure giving any stiffness of the same order of magnitude as that of the member has an advantageous effect of the kind mentioned above but as high a pressure as is practicable in all the circumstances is desirable. Such pressure is generally hydraulically applied but in some miniature constructions it may be pneumatic.

Thus a preferred embodiment of the invention is a machine or structure including a load-bearing member secured at one end and tensioned by means of a column of hydraulic fluid of appropriate stiffness applied at the other end, the pressure of the hydraulic fluid being maintained at a constant value by means of a reducing valve with venting and a throttle.

Machines and structures to which the invention may be applied comprise machine tools, scientific measuring and positioning equipment, radio aerials, television masts, and radar dishes, for example. Machine tools of which the bed is of concrete and aluminum can have components accurately positioned by means of a member or members stressed according to the invention. A machine tool can have a carriage movable by means of a lead screw pre-tensioned according to the invention and driven under servo-control. Back-lash is thus reduced and slack taken up as is particularly important in a numerical controlled machine tool. An aerial or mast can be supported against wind pressure and a radar dish focussed, aligned and protected against movement due to temperature variation, for example as a result of a change of position by the sun, or due to wind pressure or vibration by a member tensioned according to the invention. Thus it will be seen that the invention is suitable for taking up small movements and increasing the dynamic stiffness of a machine or structure. Members tensioned according to the invention can be built to ordinary engineering tolerances, as leakage of hydraulic fluid is not detrimental, and can be used in place of hydrostatic bearings which require very fine clearances.

The invention is illustrated by way of example in the accompanying drawings of which:

FIGURE 1 shows a lead screw 10 secured at its left-hand end, carrying a nut 12 and adapted for tensioning at its right-hand end.

Figure 1:
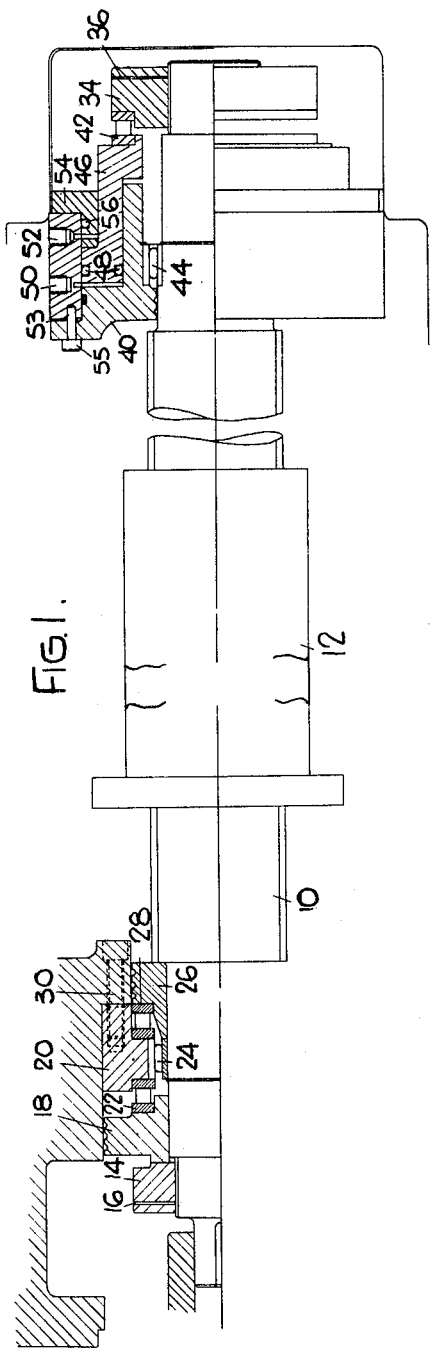
FIGURE 1 shows a lead screw capable of being tensioned according to the invention, the upper half being in section and the lower half in elevation.

At its left-hand end the lead screw 10 has a fixed nut 14 with a split 16 which is compressed by means of a screw (not shown) so as to deform the thread of the nut 14 and fix it on the end of the lead screw 10. Adjacent the nut 14, the lead screw 10 carries an annulus 18 which is separated from a fixed member 20 by a thrust bearing 22. The lead screw 10 itself is separated from the fixed member 20 by means of a needle bearing 24. Adjacent the needle bearing 24, the lead screw 10 carries another annulus 26 which is separated from the fixed member 20 by means of a thrust bearing 28. The fixed member 20 is spaced from the bed of the machine tool on which it is mounted by means of a bolt 30.

At its right-hand end the lead screw 10 carries a fixed nut 34 which, like the fixed nut 14, has a split 36 by means of which the nut 34 is fixed to the lead screw 10. The lead screw 10 is separated by a needle bearing 44 from a fixed member 40. In the fixed member 40 there is slidably mounted a piston 46 having oil seals 48 and bearing on the nut 34 through a thrust bearing 42. The fixed member 40 has an inlet 50 for hydraulic fluid under pressure and a vent 52 for oil leakage beyond the piston head. Thus there is a very short column of fluid between the head of the piston 46 and the fixed member 40. The piston 46 is guided by a removable cylinder block 54, secured to the fixed member 40 and provided with an oil seal 56. The inlet 50 and vent 52 are mounted in a plate 53 secured to the fixed member 40 by means of a bolt 55.

Figure 2:
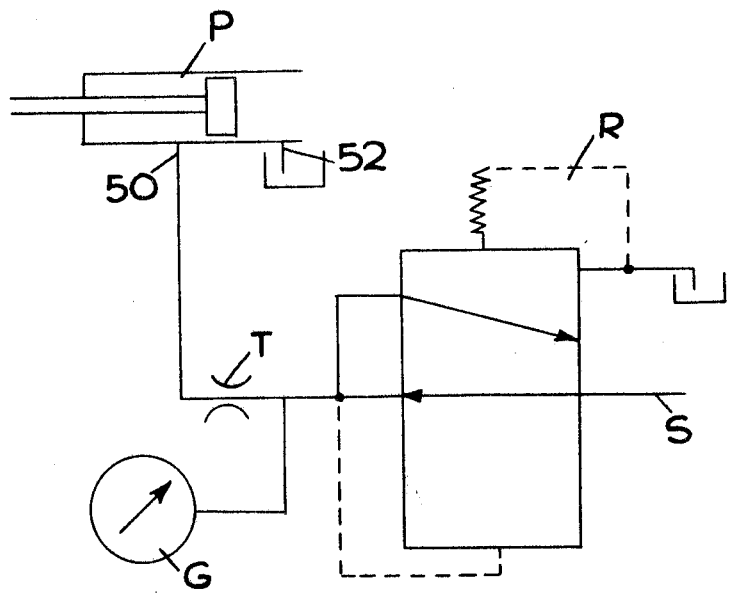
FIGURE 2 shows schematically the hydraulic circuitry associated with the lead screws of FIGURE 1 for tensioning according to the invention.

In FIGURE 2 the whole piston 46 and surrounding cylinder is schematically indicated at P. Constant pressure from a source S is controlled by a reducing valve R with venting and passed through a throttle T to the inlet 50. A gauge G indicates inlet pressure.

By means of the hydraulic circuitry shown in FIGURE 2 the lead screw 10 can be tensioned by a column of fluid maintained at a constant pressure and applied to the head of the piston 46 so that the column of fluid has a stiffness of the same order of magnitude as or generally greater than that of the lead screw 10. Small changes in the load carried by the lead screw 10 will tend to move the piston 46 and such movement will be accommodated by the hydraulic circuitry and the tensioning of the lead screw 10 thus maintained constant. In this way vibrations from the machine tool itself or adjacent machinery and temperature changes such as occur in operation are damped and the accuracy of the operation of the machine tool is maintained.

What we claim is:
1. A method of stressing or tensioning a load-bearing member consisting in securing said member at one end, applying pressure to the other end of said member from a short column of fluid of a stiffness of at least the same order of magnitude as that of the member and maintaining said pressure constant.

2. A method of stressing or tensioning a load-bearing member as claimed in claim 1, wherein said pressure is hydraulically applied.

3. In a device having a load-bearing member, means for stressing or tensioning said member comprising a fixed thrust bearing having one end of said member bearing thereagainst, a fixed cylinder, a piston slidable in said cylinder and bearing against the other end of said member, a reducing valve for venting said cylinder, and a throttle controlling the inlet of said cylinder whereby a column of hydraulic fluid of a stiffness of at least the same order of magnitude of that of the member is maintained at a constant pressure to said member's other end.

4. In a device as claimed in claim 3 wherein said member is a machine lead screw.

5. In a device as claimed in claim 3 wherein said member is a machine tool including a lead screw.

References Cited

UNITED STATES PATENTS

| 2,061,778 | 11/1936 | Schicht | 51—232 |
| 2,195,799 | 4/1940 | Parsons | 74—441 |
| 2,959,064 | 11/1960 | Geyer et al. | 74—441 |
| 3,031,897 | 1/1962 | Seidel | 74—441 |
| 3,053,106 | 9/1962 | Goldman | 74—441 |

LEONARD H. GERIN, Primary Examiner

U.S. Cl. X.R.

74—89.15, 424.8